(12) United States Patent
Yamamoto

(10) Patent No.: US 7,347,696 B2
(45) Date of Patent: Mar. 25, 2008

(54) ELECTRICAL JUNCTION BOX HAVING AN ADJUSTMENT HOLE

(75) Inventor: Tetsuya Yamamoto, Ogasa-gun (JP)

(73) Assignee: Yazaki Corporation, Tokyo (JP)

( * ) Notice: Subject to any disclaimer, the term of this patent is extended or adjusted under 35 U.S.C. 154(b) by 561 days.

(21) Appl. No.: 11/012,150

(22) Filed: Dec. 16, 2004

(65) Prior Publication Data
US 2005/0136727 A1 Jun. 23, 2005

(30) Foreign Application Priority Data
Dec. 17, 2003 (JP) ............................ P2003-419350

(51) Int. Cl.
*H01R 33/00* (2006.01)
(52) U.S. Cl. ........................................ 439/34; 116/288
(58) Field of Classification Search .................. 439/34; 116/288, 291, 292, 62.1, 47, 284; 235/61 J; 361/647
See application file for complete search history.

(56) References Cited
U.S. PATENT DOCUMENTS

| 2,514,745 A | * | 7/1950 | Dalzell | ........................ 324/115 |
| 2,700,867 A | * | 2/1955 | Doane | ........................ 368/184 |
| 3,619,778 A | * | 11/1971 | Schwartz | ...................... 324/114 |
| 5,353,190 A |  | 10/1994 | Nakayama et al. | |
| 5,502,615 A |  | 3/1996 | Kubota et al. | |
| 5,663,866 A |  | 9/1997 | Ichikawa et al. | |
| 5,797,345 A | * | 8/1998 | Evans et al. | ................. 116/286 |
| 5,977,868 A | * | 11/1999 | Itakura | ....................... 340/438 |
| 6,621,688 B1 |  | 9/2003 | Burdick | |

FOREIGN PATENT DOCUMENTS

JP          2003-146223 A          5/2003

* cited by examiner

*Primary Examiner*—Hae M Hyeon
(74) *Attorney, Agent, or Firm*—Sughrue Mion, PLLC

(57) ABSTRACT

An electrical junction box is located so as to oppose to an adjuster which is provided on a rear face of an on-vehicle instrument. The electrical junction box has a first face which faces the on-vehicle instrument, and a second face which is opposite to the first face. At least one through hole is formed so as to communicate the first face and the second face. The electrical junction box is configured to be disposed such that the through hole opposes the adjuster.

4 Claims, 4 Drawing Sheets

ELECTRICAL JUNCTION BOX HAVING AN ADJUSTMENT HOLE

CROSS-REFERENCE TO RELATED APPLICATIONS

This application claims priority to Japanese Application No. 2003-419350, filed on Dec. 17, 2003.

BACKGROUND OF THE INVENTION

This invention relates to an electrical junction box for being mounted on a rear face of an on-vehicle instrument in overlapping relation to an adjuster of this instrument.

Instruments, including a speedometer, are mounted within an instrument panel or a steering column of a vehicle. In this kind of on-vehicle instrument, a movement is angularly moved in accordance with a speed measurement signal or the like, and a pointer, moving in interlocked relation to the movement, indicates a speed value or the like. In this kind of on-vehicle instrument, an adjuster for setting and adjusting the behavior and indication value of a pointer, etc., is, in many cases, provided at a rear side of the movement, with a base board interposed therebetween.

On the other hand, electrical junction boxes (called a junction block or a junction box), containing a branch connector of a wire harness, functional circuits, etc., are mounted in a vehicle. Among such electrical junction boxes, there is the type which is located within an instrument panel or a steering column, and particularly is located at a rear side of an on-vehicle instrument as disclosed in Japanese Patent Publication No. 2003-146223A. In this case, there are occasions when such an electrical junction box is mounted in overlapping relation to the adjuster provided on the rear face of the on-vehicle instrument.

However, once the electrical junction box is mounted in the above position, it is very difficult to operate the adjuster of the on-vehicle instrument from the exterior since the electrical junction box is disposed in overlapping relation to the adjuster. Therefore, for operating the adjuster, it is necessary to once remove the mounted electrical junction box. Then, it is necessary to again mount the electrical junction box in position. Namely, it is necessary to perform detaching and attaching operation of the electrical junction box in addition to the originally-intended adjusting operation.

In recent years, there are extensively used combination meters having a plurality of indicators (including a speedometer, a tachometer for an engine, a temperature indicator, etc.,) integrally incorporated therein. In this case, it is necessary to adjust movements corresponding respectively to the plurality of indicators, and the frequency of adjustments of the adjusters increases more and more. Namely, it becomes essential to reduce the time and labor required for the above adjusting operation.

SUMMARY OF THE INVENTION

It is therefore an object of this invention to provide an electrical junction box which enables an adjuster of an on-vehicle instrument to be operated, with the electrical junction box kept mounted on this instrument, so that the time and labor, required for the adjusting operation, can be reduced.

In order to achieve the above object, according to the invention, there is provided an electrical junction box located so as to oppose to an adjuster which is provided on a rear face of an on-vehicle instrument, comprising:

a first face, which faces the on-vehicle instrument; and
a second face, which is opposite to the first face, wherein:
at least one through hole is formed so as to communicate the first face and the second face; and
the electrical junction box is configured to be disposed such that the through hole opposes the adjuster.

With this configuration, even when the electrical junction box is located so as to overlap with the adjuster of the on-vehicle instrument, the adjuster can be actuated through the through hole. Therefore, the time and labor, required for the adjusting operation, can be greatly reduced.

Preferably, the through hole also serves as a pilot hole used when the electrical junction box is assembled.

With this configuration, since the pilot hole is originally provided in this kind of electrical junction box, it is not necessary to provide a new hole for exclusive use as the adjustment hole.

Preferably, the through hole opposes to a rear face of a movement for moving a pointer of the on-vehicle instrument.

In order to adjust the pointer, it is necessary to adjust the movement, and in many cases, the adjuster is provided at the rear side of the movement. Therefore, by providing the through hole at the position opposing to the rear face of the movement, the adjustment of the pointer can be reliably executed while the electrical junction box kept mounted on the instrument.

Preferably, the through hole opposes each of adjusters for a speedometer, an engine tachometer and a temperature indicator included in the on-vehicle instrument.

Since the frequency of adjustments of the instrument including a plurality of indicators is high, the claimed configuration is useful because the electrical junction box which enables the adjusters to be actuated while the electrical junction box kept mounted on such an instrument.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE INVENTION

One embodiment of the present invention will be described below in detail with reference to the accompanying drawings.

Figure 1:
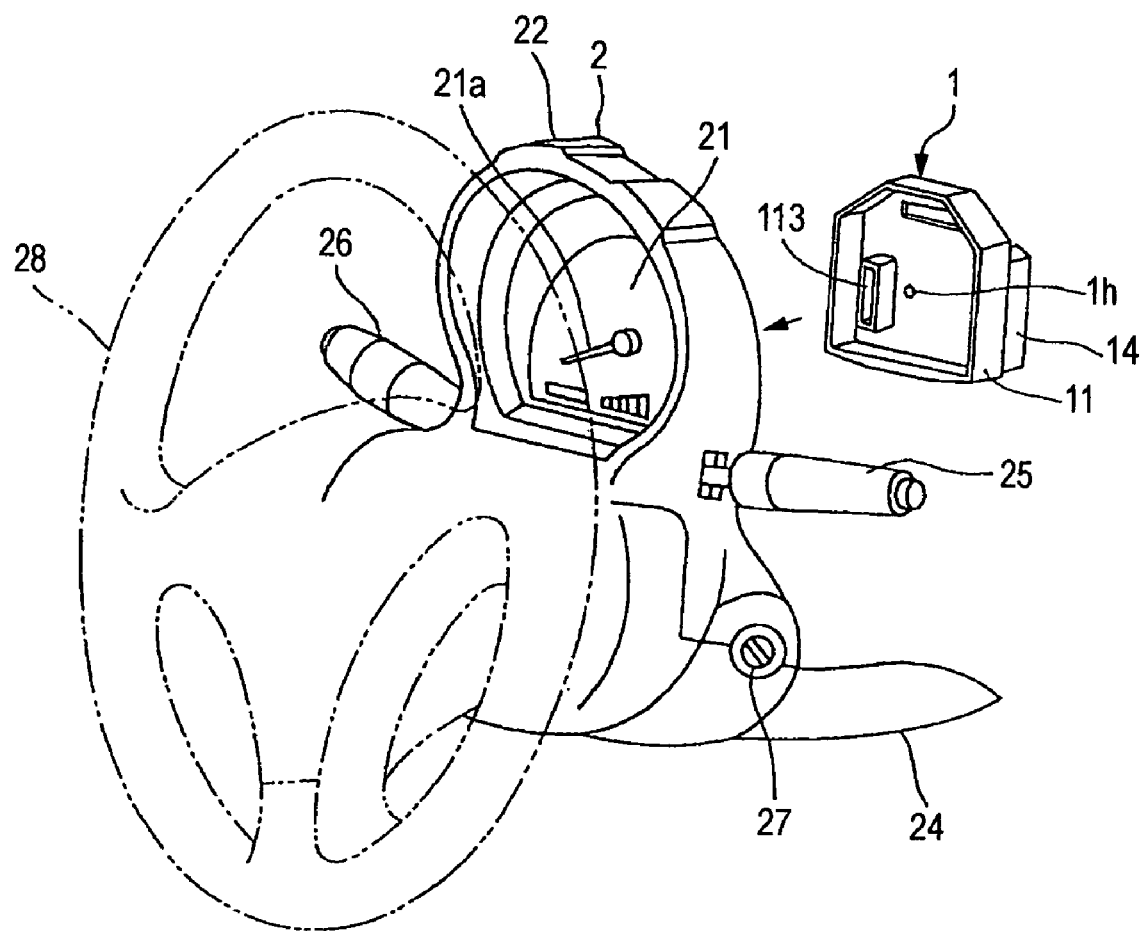
FIG. 1 is a schematic perspective view of an electrical junction box according to one embodiment of the invention, showing a state before the electrical junction box is mounted on an on-vehicle instrument.
Figure 2:
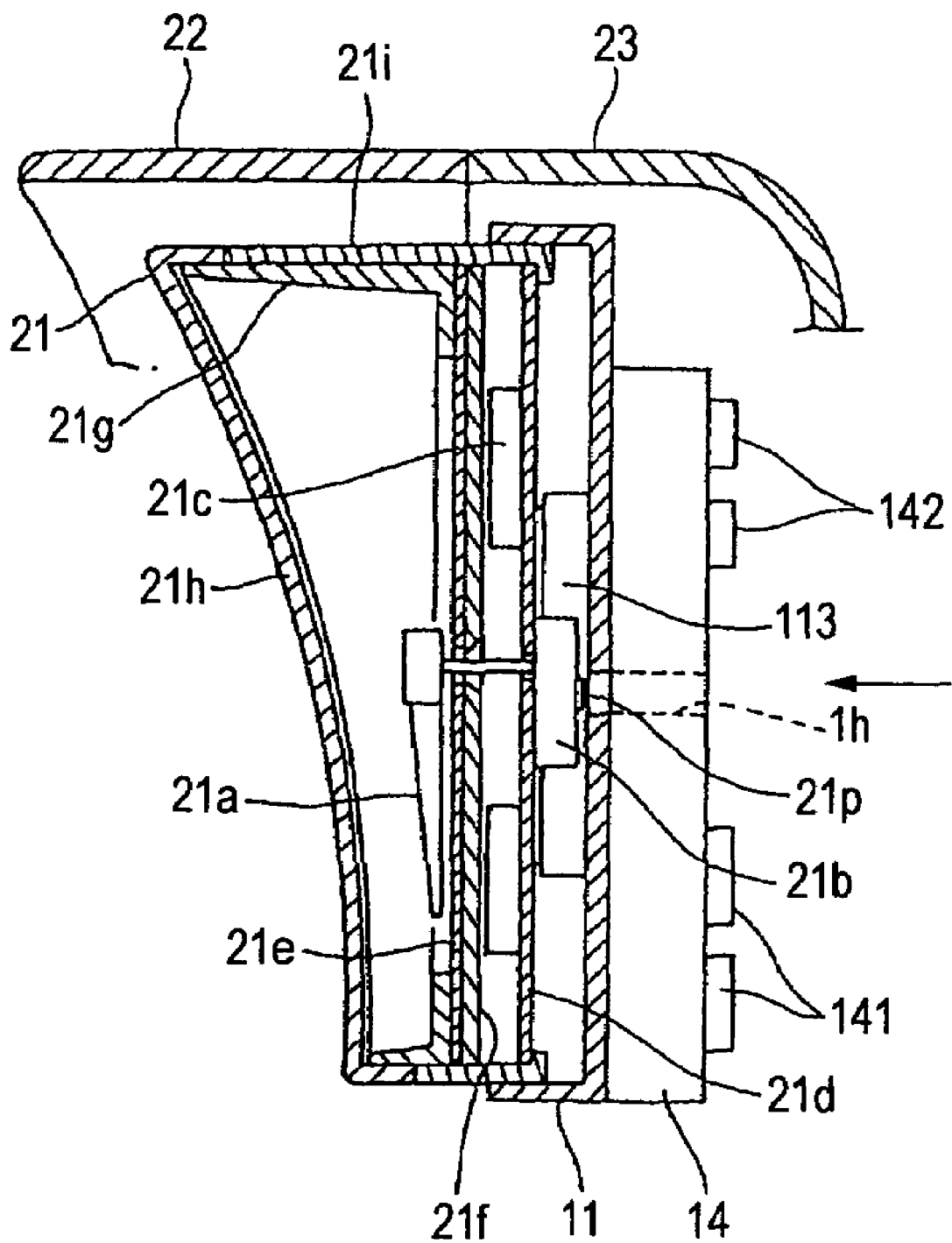
FIG. 2 is a section view of the electrical junction box, showing a state after the electrical junction box is mounted on the on-vehicle instrument.

As shown in FIGS. 1 and 2, an electrical junction box 1 is mounted on a rear or back side of an instrument 21 fitted in a steering column 2. An adjustment hole 1h is formed through that portion of the electrical junction box 1 corresponding to an adjuster 21p of the instrument 21. As is well known, the steering column 2 comprises a front cover 22, a rear cover 23, and a lower cover 24. A turn signal switch 25, a wiper switch 26 and an ignition switch 27 are provided on a side face of the steering column 2, and a steering wheel 28 is mounted on a front side of the steering column 2. Although the instrument 21, illustrated here, is a single-eye meter basically forming a speedometer, it can be replaced by a well-known combination meter including a speedometer, a tachometer, a temperature indicator, etc.

As is well known, the instrument 21, fitted in the steering column 2, comprises: a base board 21d on which a pointer 21a indicating a speed value, a movement 21b for turning a pointer 21a, an electronic component 21c such as a microcomputer, the adjuster 2lp, a light source element (not shown), etc., are mounted; a dial plate 21e having a design (speed scales and others) formed thereon; a light-guide plate 21f for efficiently guiding light from the light source element to the dial plate 21e; an end plate 21g secured to a front side of the dial plate 21e; a front glass panel 21h provided in front of the dial plate 21e to cover the same; and a casing 21i, as shown in FIG. 2. The adjuster 2lp is provided for setting and adjusting the behavior and indication value of the pointer, etc. The adjuster 21p can be operated, for example, by a micro screw-driver or a small-diameter wrench which is inserted into the adjustment hole 1h in a direction of an arrow in FIG. 2.

The electrical junction box 1 is mounted on the rear face of the instrument 21, and more specifically on the rear face of the base board 21d. The electrical junction box 1 is mounted in this position in such a manner that a connector 113, formed on a front face thereof is fitted to a connector (not shown) formed on the rear face of the instrument 21.

Figure 3:
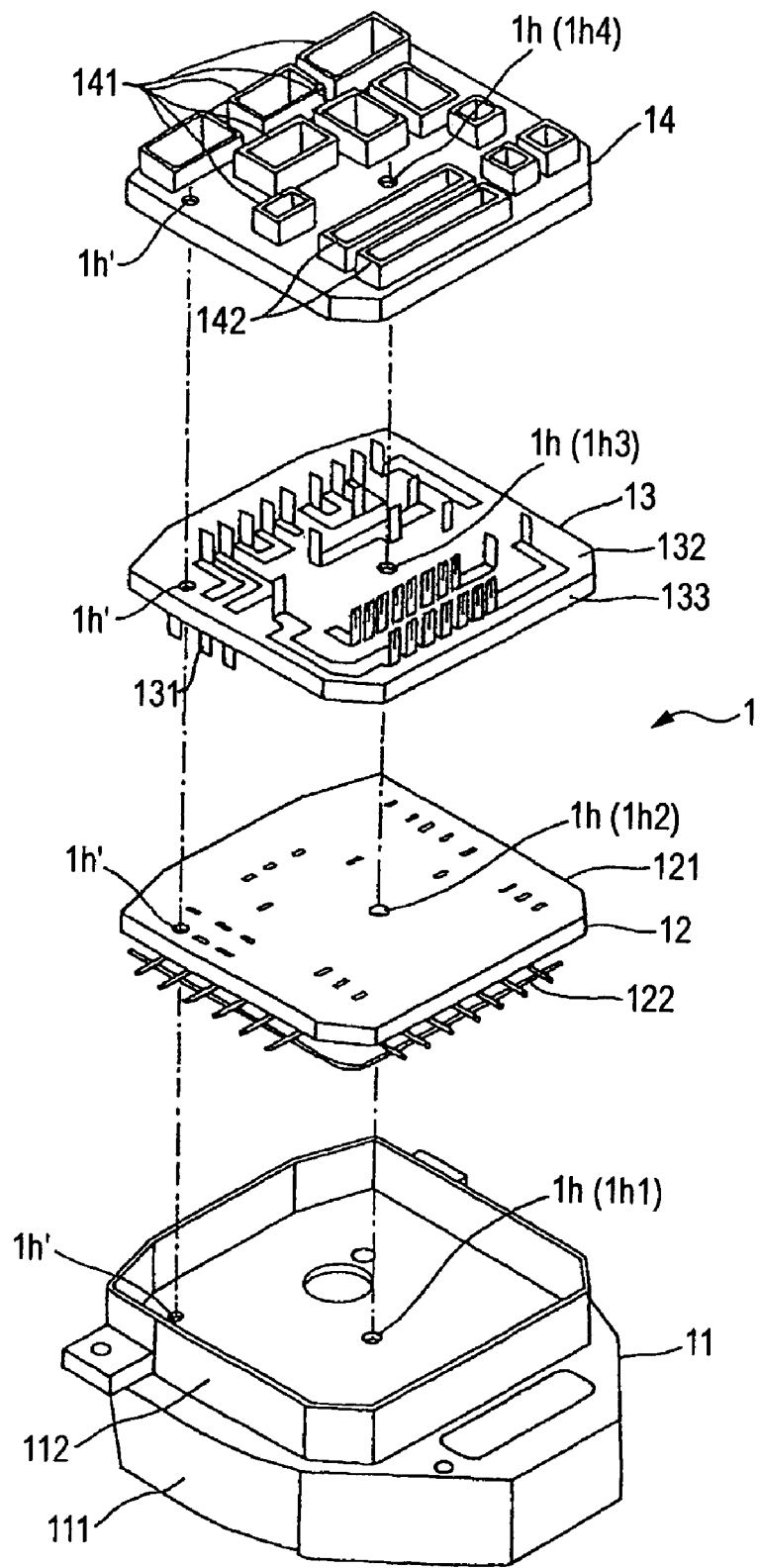
FIG. 3 is a perspective view of the electrical junction box, showing a disassembled state thereof.

As shown in FIG. 3, the electrical junction box 1 comprises an undercover 11, a wiring unit 12, a bus bar unit 13, and a main cover 14. Although the electrical junction box 1 further includes an electronic circuit section or the like, the showing of these parts is omitted since they are not particularly necessary for the understanding of the subject matter of the invention.

The undercover 11 is made of resin, and includes: a base portion 111 having a generally trapezoidal shape when viewed from the upper side; and a holder 112 having a generally square shape when viewed from the upper side for receiving the wiring unit 12, the bus bar unit 13, etc. A through hole 1h1 is formed through a generally central portion of a bottom of the holder 112, and this through hole 1h1 forms part of the adjustment hole 1h.

The wiring unit 12 comprises a wiring holder 121, and wires 122 installed on this wiring holder 121. The wiring holder 121 is made of an insulative material such as resin, and has generally the same plan shape (as viewed from the upper side) as a bus bar holder 133 (described later). The disk-shaped wiring holder 121 has a plurality of retainers for retaining the wires 121 in a predetermined position. The wires 122 are connected to small-current bus bars 131 to transfer small current such as data signals and control signals. A through hole 1h2 is formed through a generally central portion of the wiring holder 121, and this through hole 1h2 forms part of the adjustment hole 1h.

The bus bar unit 13 comprises the small-current bus bars 131, large-current bus bars 132, and the bus bar holder 133.

Each of the small-current bus bars 131 are formed of a metal sheet, and mainly transfer small current such as data signals and control signals of a microcomputer and various electrical circuits. The small-current bus bars 131 have tab-like terminals formed integrally therewith and projecting perpendicularly therefrom. The small-current bus bar layer 131 is mounted on the bus bar holder 133 in such a manner that the tab-like terminals extend through the bus bar holder 133.

On the other hand, each of the large-current bus bars 132 are formed of a metal sheet, and mainly transfer large current supplied as electric power from an alternator or a battery. The large-current bus bars 132 also have tab-like terminals formed integrally therewith and projecting perpendicularly therefrom. The large-current bus bar layer 132 is mounted on the bus bar holder 133 in such a manner that the tab-like terminals extend through the bus bar holder 133.

The bus bar holder 133 is made of an insulative material such as resin, and the small-current bus bar layer 131 and the large-current bus bar layer 132 are mounted on the opposite sides of the bus bar holder 133, respectively. A through hole 1h3 is formed through a generally central portion of the bus bar holder 133, and this through hole 1h3 forms part of the adjustment hole 1h.

The main cover 14 is made of resin, and when viewed from the upper side, this main cover 14 has a generally square shape corresponding to the shape of the holder 112 of the undercover 11, and is open downwardly (in this figure). A plurality of connector receivers 141 for respectively receiving socket-shaped connectors (not shown), fuse receivers 142 for respectively receiving fuses (not shown), and other portions are formed on an upper face of the main cover 14. A through hole 1h4 is formed through a generally central portion of the main cover 14, and this through hole 1h4 forms part of the adjustment hole 1h.

When the assembling of the electrical junction box 1 is completed, the through holes 1h1 to 1h4 are vertically aligned with one another to form the adjustment hole 1h extending straight through the electrical junction box 1. Therefore, the electronic circuit portion, the board and others, received within the electrical junction box 1, are arranged to avoid the adjustment hole 1h. Although members used for combining the main cover 14 and the undercover 11 together) are provided at the main cover 14 and the undercover 11, the showing of such members is omitted in FIG. 3.

Figure 4A:
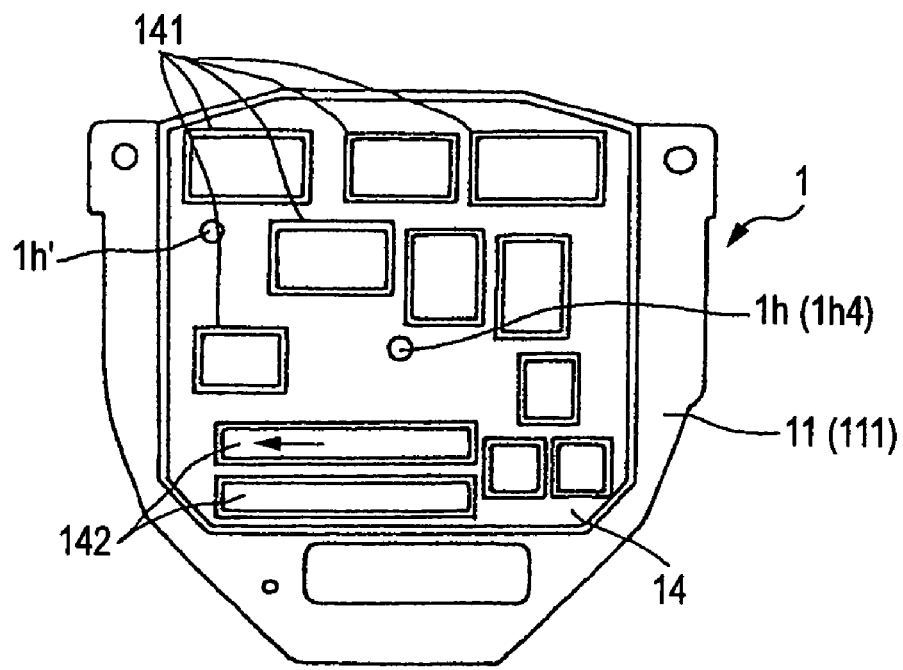
FIG. 4A is a front view of the electrical junction box of an assembled state.

When the assembled electrical junction box 1 is viewed from the front side (upper side) thereof, it can be seen from FIG. 4A that the generally-square main cover 14, having the connector receivers 141, the fuse receivers 142, etc., formed thereon, is attached to the undercover 11 to cover the holder 112, and that the adjustment hole 1h (1h4) is formed through the generally central portion of the main cover 14.

Figure 4B:
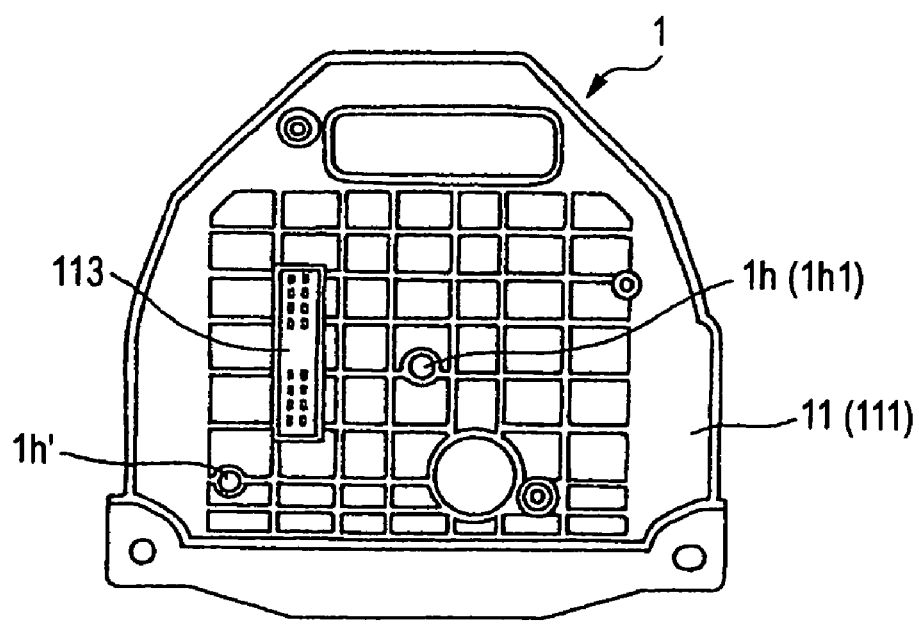
FIG. 4B is a rear view of the electrical junction box of the assembled state.

When the assembled electrical junction box 1 is viewed from the rear side thereof, it can be seen from FIG. 4B that the adjustment hole 1h (1h1) is formed through the generally central portion of the undercover 11, and that the connector 113 is disposed at the left side of this adjustment hole 1h.

The adjustment hole 1h also serves as a guide hole when mounting the bus bar unit 13 and the wiring unit 12, using pilot holes 1h' as a reference, that is, the adjustment hole 1h also serves as a pilot hole used as a positioning member when the electrical junction box 1 is assembled. The electrical junction box 1 is mounted on the instrument 21 in such a manner that the adjustment hole 1h is aligned with (or coincides with) the adjuster 21p as shown in FIG. 2. According to the provision of this adjustment hole 1h, the adjuster 21p can be operated, with the electrical junction box 1 kept mounted on the instrument 21, and therefore the time and labor, required for the adjusting operation, can be greatly reduced. And besides, the adjustment hole 1h serves also as the pilot hole which is originally provided in this kind of electrical junction box, and therefore it is not necessary to provide a new hole for exclusive use as the adjustment hole. Therefore, it is not necessary to change the various layouts and the wire installation arrangement within the electrical junction box.

When the electrical junction box 1 is used with a combination meter (which contains a speedometer, a tachometer for an engine, a temperature indicator, etc.,) instead of with the illustrated single-eye meter, the electrical junction box 1 is more useful. Namely, the frequency of adjustments of the combination meter (containing the plurality of indicators) is high, and therefore the electrical junction box which enables the adjuster to be operated with the electrical junction box kept mounted on the instrument will be utilized many times, and therefore is useful.

Although the present invention is shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

For example, the adjustment hole in the electrical junction box of the invention is not limited to the illustrated construction in the above embodiment. For example, when there are provided a plurality of adjusters, a plurality of adjustment holes, corresponding respectively to these adjusters, may be provided, or an adjustment hole may be provided in alignment only with that adjuster which is most frequently used. With respect to the position of formation of the adjustment hole, the adjustment hole may not be formed in the generally central portion of the electrical junction box, but may be formed in any other suitable portion of the electrical junction box in so far as the adjustment hole coincides with the corresponding adjuster. Further, the adjuster which can be operated through the adjustment hole can be designed so as to enable the adjustment of any other suitable portion than the pointer and the movement.

What is claimed is:

1. An electrical junction box located so as to oppose to an adjuster which is provided on a rear face of an on-vehicle instrument, the electrical junction box comprising:
   a first face, which faces the on-vehicle instrument; and
   a second face, which is opposite to the first face, wherein:
   at least one through hole is formed so as to communicate the first face and the second face; and
   the electrical junction box is configured to be disposed such that the through hole opposes the adjuster.

2. The electrical junction box as set forth in claim 1, wherein the through hole also serves as a pilot hole used when the electrical junction box is assembled.

3. The electrical junction box as set forth in claim 1, wherein the through hole opposes to a rear face of a movement for moving a pointer of the on-vehicle instrument.

4. The electrical junction box as set forth in claim 1, wherein the through hole opposes each of adjusters for a speedometer, an engine tachometer and a temperature indicator included in the on-vehicle instrument.

* * * * *